US011070591B2

(12) United States Patent
Smith et al.

(10) Patent No.: US 11,070,591 B2
(45) Date of Patent: Jul. 20, 2021

(54) DISTRIBUTED NETWORK APPLICATION SECURITY POLICY ENFORCEMENT

(71) Applicant: Zscaler, Inc., San Jose, CA (US)

(72) Inventors: Peter Smith, Acton, MA (US); Thomas Evan Keiser, Jr., Boston, MA (US)

(73) Assignee: Zscaler, Inc., San Jose, CA (US)

( * ) Notice: Subject to any disclaimer, the term of this patent is extended or adjusted under 35 U.S.C. 154(b) by 207 days.

(21) Appl. No.: 16/578,175

(22) Filed: Sep. 20, 2019

(65) Prior Publication Data

US 2020/0021618 A1    Jan. 16, 2020

Related U.S. Application Data

(63) Continuation-in-part of application No. 16/214,843, filed on Dec. 10, 2018, now abandoned, which is a
(Continued)

(51) Int. Cl.
*H04L 29/06* (2006.01)
*G06F 21/60* (2013.01)
*G06F 21/62* (2013.01)

(52) U.S. Cl.
CPC ............ *H04L 63/20* (2013.01); *G06F 21/606* (2013.01); *G06F 21/6218* (2013.01);
(Continued)

(58) Field of Classification Search
CPC ............... G06F 21/606; G06F 21/6218; H04L 63/0263; H04L 63/102; H04L 63/20
(Continued)

(56) References Cited

U.S. PATENT DOCUMENTS 6,009,475 A * 12/1999 Shrader ............... H04L 63/0263
                                                         709/249
6,138,162 A * 10/2000 Pistriotto ............... H04L 29/06
                                                         709/218

(Continued)

OTHER PUBLICATIONS

International Preliminary Report on Patentability dated Aug. 22, 2019, by the International Bureau in International Patent Application No. PCT/US2018/059924, 6 pages.
(Continued)

*Primary Examiner* — Dant B Shaifer Harriman
(74) *Attorney, Agent, or Firm* — Clements Bernard Walker; Lawrence A. Baratta, Jr.

(57) ABSTRACT

A system validates the establishment and/or continuation of a connection between two applications over a network using a two-stage process: (1) a local security agent executing on the same source system as the source application validates the connection against a set of policies stored locally on the source system; and (2) a local security agent executing on the same destination system as the destination application validates the connection against a set of policies stored locally on the destination system. The connection is allowed or blocked depending on the outcome of the two-stage validation. Before the validation process, a policy enforcement engine distributes copies of a trusted public certificate to the source and destination local security agents, which extend their local copies of the certificate to enable them to enforce policies without the use of a backend system.

20 Claims, 8 Drawing Sheets

Related U.S. Application Data continuation of application No. 15/883,534, filed on Jan. 30, 2018, now Pat. No. 10,154,067.

(60) Provisional application No. 62/457,508, filed on Feb. 10, 2017.

(52) U.S. Cl.
CPC ........ H04L 63/0263 (2013.01); H04L 63/102 (2013.01); *H04L 63/30* (2013.01)

(58) Field of Classification Search
USPC .......................................................... 726/1
See application file for complete search history.

(56) References Cited

U.S. PATENT DOCUMENTS

| | | | | |
|---|---|---|---|---|
| 7,316,029 B1* | 1/2008 | Parker | ................. | H04L 63/0272 370/428 |
| 7,383,569 B1* | 6/2008 | Elgressy | ............. | G06F 21/6281 726/2 |
| 7,620,985 B1* | 11/2009 | Bush | ................... | H04L 63/1433 726/22 |
| 8,166,533 B2* | 4/2012 | Yuan | ..................... | H04L 63/029 726/11 |
| 8,499,348 B1* | 7/2013 | Rubin | ................... | G06F 21/554 726/22 |
| 8,677,471 B2* | 3/2014 | Karels | ................. | H04L 63/0209 726/11 |
| 9,773,107 B2* | 9/2017 | White | ................. | H04L 63/0227 |
| 10,154,067 B2* | 12/2018 | Smith | ................. | G06F 21/6218 |
| 10,348,599 B2 | 7/2019 | O'Neil et al. | | |
| 10,362,048 B2* | 7/2019 | Alexander | .......... | H04L 63/1408 |
| 10,439,985 B2 | 10/2019 | O'Neil | | |
| 10,505,899 B1* | 12/2019 | Singh | ................. | H04L 63/0263 |
| 2005/0193222 A1* | 9/2005 | Greene | ................ | H04L 63/102 726/5 |
| 2006/0095970 A1* | 5/2006 | Rajagopal | .......... | H04L 63/1408 726/25 |
| 2017/0078329 A1* | 3/2017 | Hwang | ............... | H04L 63/0263 |
| 2017/0272465 A1* | 9/2017 | Steele | ................... | H04L 63/107 |
| 2018/0041471 A1* | 2/2018 | Sudo | ................... | H04L 63/1416 |
| 2019/0349283 A1 | 11/2019 | O'Neil et al. | | |
| 2020/0028820 A1 | 1/2020 | O'Neil | | |

OTHER PUBLICATIONS

International Preliminary Report on Patentability, dated Aug. 29, 2019, in international patent application PCT/US2018/018325, 7 pages.

* cited by examiner

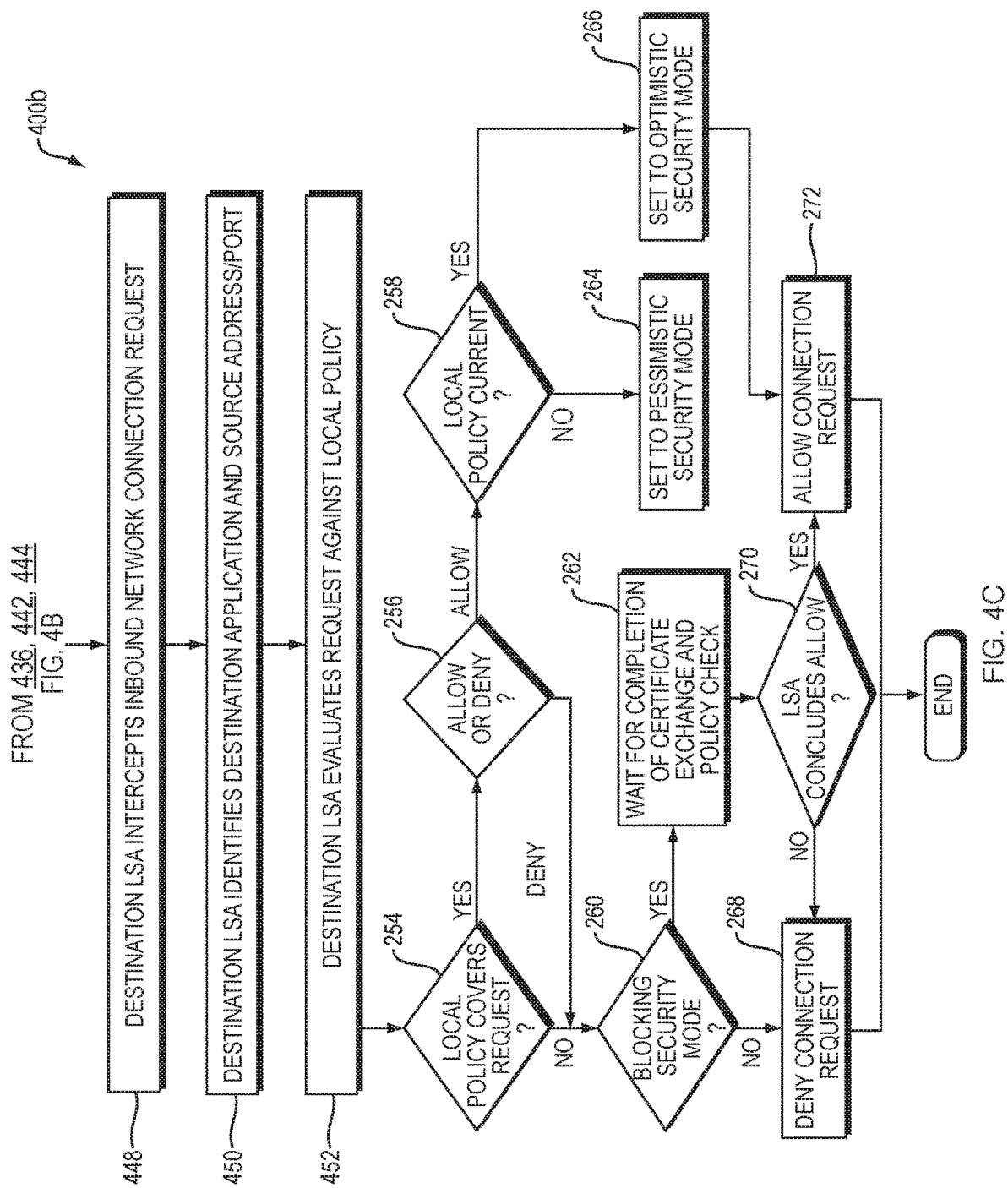

DISTRIBUTED NETWORK APPLICATION SECURITY POLICY ENFORCEMENT

BACKGROUND

Applications connected by network infrastructure communicate with each other in order to share data and perform business operations. The connection between a source application and a destination application is established by the source application, which requests a connection from its Internet Protocol (IP) address to the IP address of the destination application, typically over a specific port. Typically, existing host-based network security technologies, such as personal firewalls, allow or restrict directional access specifically at the egress or ingress point of the communication on the host on which the communication is occurring. For example, the firewall running on the host on which the source application executes typically monitors the outbound connection attempt to the destination IP address, while the firewall running on the host on which the destination application executes typically monitors the inbound connection attempt from the source IP address. Each such security component operates in relative isolation from the other, and generally only has visibility into the network-related information of the other side (e.g., IP address, port, protocol), and not into the identity of the application executing on the other host.

The limited information available to each host in such a communication restricts the types of decisions that existing security technologies can make, and allows for the hosts that are party to communications to be exploited, such as by spoofing their legitimate IP addresses to make or receive unauthorized communications.

SUMMARY

A system validates the establishment and/or continuation of a connection between two applications over a network using a two-stage process: (1) a local security agent executing on the same source system as the source application validates the connection against a set of policies stored locally on the source system; and (2) a local security agent executing on the same destination system as the destination application validates the connection against a set of policies stored locally on the destination system. The connection is allowed or blocked depending on the outcome of the two-stage validation. Before the validation process, a policy enforcement engine distributes copies of a trusted public certificate to the source and destination local security agents, which extend their local copies of the certificate to enable them to enforce policies without the use of a backend system. This validation system protects against policy violations that are not detected by traditional systems, and does so without requiring alterations to the source application, the destination application, or the network traffic between them.

Other features and advantages of various aspects and embodiments of the present invention will become apparent from the following description and from the claims.

BRIEF DESCRIPTION OF THE DRAWINGS

FIGS. 4A-4C are flowcharts of a method for performing the symmetrical validation of FIG. 3 according to one embodiment of the present invention.

DETAILED DESCRIPTION

Embodiments of the present invention perform symmetrical validation of communication between applications (or services) over a network, using agents installed on the same systems as the applications (or services), and without the need for validation by a central system. Such validation enables an imposter application to be detected and prevented from communicating even if the imposter application communicates, or attempts to communicate, using the same name and communication content as a permitted application. Embodiments of the present invention achieve this result by validating applications using application fingerprints that can distinguish permitted from prohibited applications based on features other than mere application name and communication content. Additional details and embodiments of the present invention will be described in more detail below.

The term "application," as used herein, includes both applications and services. Therefore, any reference herein to an "application" should be understood to refer to an application or a service.

Figure 1:
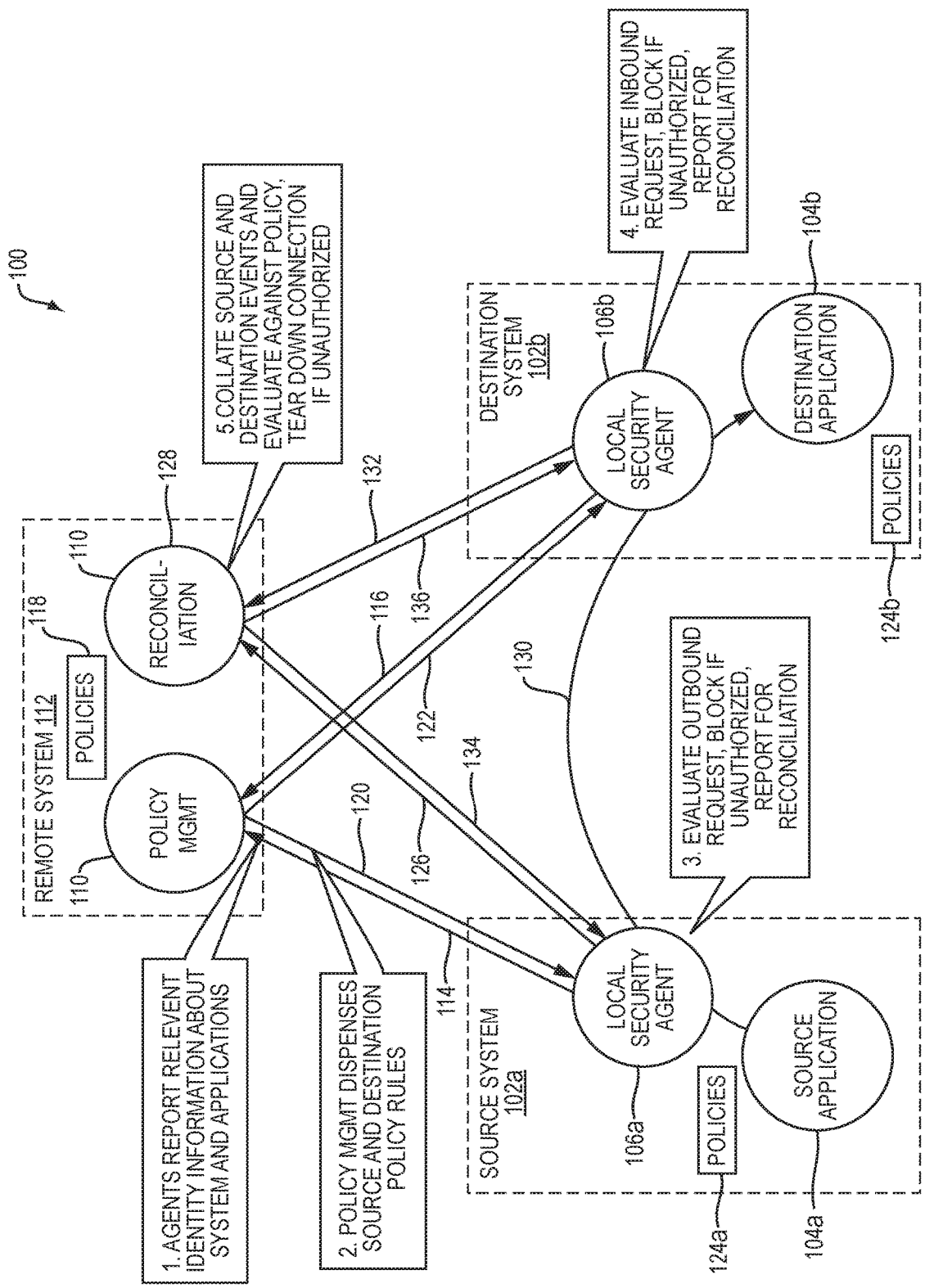
FIG. 1 is a dataflow diagram of a system for performing symmetrical validation of communications between applications over a network according to one embodiment of the present invention.
Figure 2A:
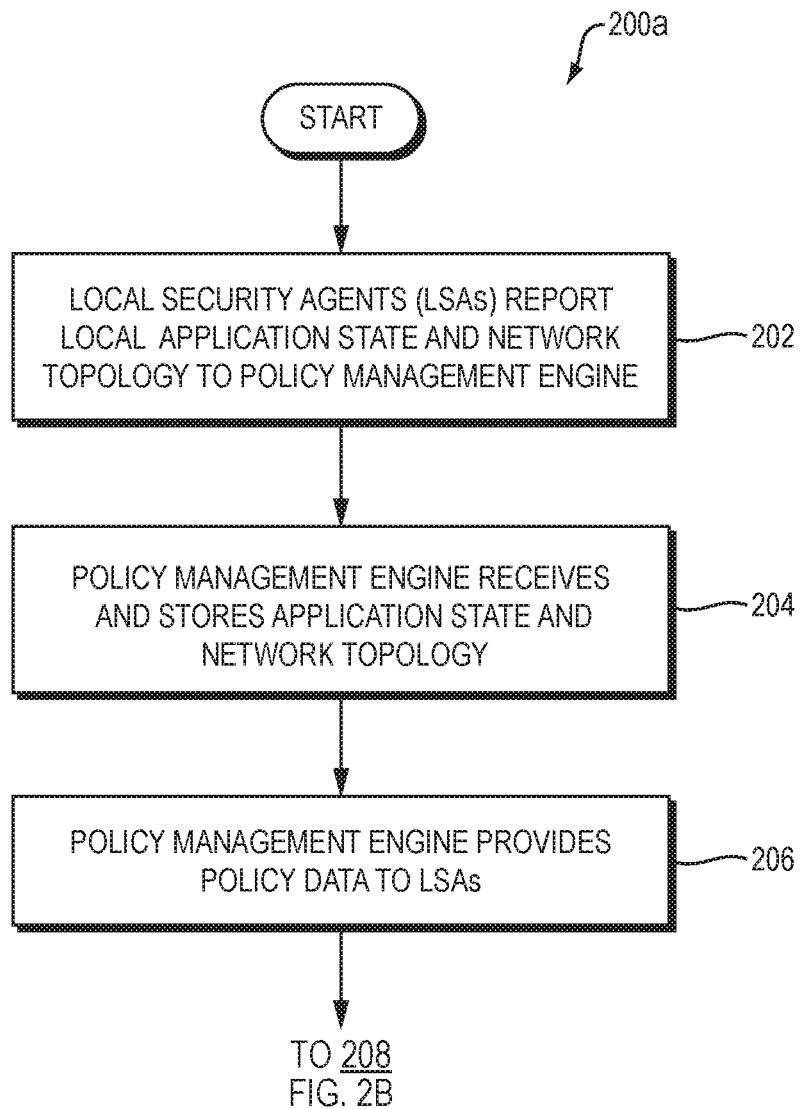
FIGS. 2A-2C are flowcharts of a method for performing the symmetrical validation of FIG. 1 according to one embodiment of the present invention.

Referring to FIG. 1, a dataflow diagram is shown of a system 100 for performing symmetrical validation of communication between applications over a network. Referring to FIG. 2A, a flowchart is shown of a method 200a performed by a policy management engine 110 according to one embodiment of the present invention.

The system 100 includes a source system 102a and a destination system 102b. A "system," as that term is used herein (e.g., the source system 102a and/or destination system 102b), may be any device and/or software operating environment that is addressable over an Internet Protocol (IP) network. For example, each of the source system 102a and the destination system 102b may be any type of physical or virtual computing device, such as a server computer, virtual machine, desktop computer, laptop computer, tablet computer, smartphone, or wearable computer. The source system 102a and the destination system 102b may have the same or different characteristics. For example, the source system 102a may be a smartphone and the destination system 102b may be a server computer. A system (such as the source system 102a and/or destination system 102b) may include one or more other systems, and/or be included within another system. As merely one example, a system may include a plurality of virtual machines, one of which may include the source system 102a and/or destination system 102b.

The source system 102a and destination system 102b are labeled as such in FIG. 1 merely to illustrate a use case in which the source system 102a initiates communication with the destination system 102b. In practice, the source system 102a may initiate one communication with the destination 102b and thereby act as the source for that communication, and the destination system 102b may initiate another communication with the source system 102a and thereby act as the source for that communication. As these examples illustrate, each of the source system 102a and the destination system 102b may engage in multiple communications with each other and with other systems, and may act as either the source or destination in those communications. Furthermore, the system 100 may include additional systems, all of which may perform any of the functions disclosed herein in connection with the source system 102a and the destination system 102b.

The source system 102a includes a source application 104a (which may, for example, be installed and executing on the source system 102a) and the destination system 102b includes a destination application 104b (which may, for example, be installed and executing on the destination system 102b). Each of these applications 104a and 104b may be any kind of application, as that term is used herein. The source application 104a and the destination application 104b may have the same or different characteristics. For example, the source application 104a and destination application 104b may both be the same type of application or even be instances of the same application. As another example, the source application 104a may be a client application and the destination application 104b may be a server application, or vice versa.

An embodiment will now be described for enforcing security policies on a communication that the source system 102a attempts to initiate with the destination system 102b. In this embodiment, the source system 102a includes a local security agent 106a and the destination system 102b includes a local security agent 106b. More generally, a local security agent may be contained within (e.g., installed and executing on) any system that executes one or more applications to which the security techniques disclosed herein are to be applied. A local security agent may, for example, execute within the same operating system on the same system as the application(s) that the local security agent monitors. Each such local security agent (e.g., the local security agents 106a and 106b) may include any combination of hardware and/or software for performing the functions disclosed herein.

The system 100 also includes a policy management engine 110. The policy management engine may include any combination of hardware and/or software for performing the functions disclosed herein. In the particular embodiment illustrated in FIG. 1, the policy management engine 110 is contained within (e.g., installed and executing on) a remote system 112. The remote system 112 may be any device and/or software application that is addressable over an IP network. For example, the remote system 112 may be any type of computing device, such as a server computer, virtual machine, desktop computer, laptop computer, tablet computer, smartphone, or wearable computer. The remote system 112 and the source and destination systems 102a-b may have the same or different characteristics. For example, the source and destination systems 102a-b may be smartphones and the remote system 112 may be a server computer.

Some or all of the local security agents 106a-b may report the state of the local applications as well as the state of the network on their system to the policy management engine 110 (FIG. 2A, operation 202). For example, in FIG. 1, the local security agent 106a is on the same system as and monitors the source application 104a. The local security agent 106a may, therefore, obtain state information about the source application 104a and report some or all of that state information, and/or information derived therefrom, to the policy management engine 110. Although in the example of FIG. 1 only one source application 104a is shown on the source system 102a, any number of source applications may execute on the source system 102a, and the local security agent 106a may obtain and report state information for some or all of such source applications to the policy management engine 110. The local security agent 106a may also report information about the network configuration on source system 102a that will help the policy management engine 110 identify system 102a to other systems independent of the applications that may be executing. The local security agent 106a may also report information about the system network topology of the source system 102a, such as its IP addresses and/or Address Resolution Protocol (ARP) cache. All such reporting is represented by communication 114 in FIG. 1. Such communication 114 may be implemented in any of a variety of ways, such as by the local security agent 106a transmitting (e.g., via IP and/or another network communication protocol) one or more messages containing the obtained application state and network configuration information to the policy management engine 110.

Similarly, the local security agent 106b on the destination system 102b may obtain and transmit state information for the destination application 104b (and for any other applications executing on the destination system 102b) and for the network configuration information of destination system 102b and transmit such information via communication 116 to the policy management engine 110 in any of the ways disclosed above in connection with the local security agent 106a, the source system 102a, the source application 104a, and the communication 114.

The policy management engine 110 may receive the transmitted state information 114 and 116 and store some or all of it in any suitable form (FIG. 2A, operation 204). As described above, such state information may include both application state information and network topology information (e.g., addresses, listening ports, broadcast zones). The policy management engine 110 may, for example, store such state information 114 and 116 in a log (e.g., database) of state information received from one or more local security agents (e.g., local security agents 106a-b) over time. Such a log may include, for each unit of state information received, an identifier of the system (e.g., source system 102a or destination system 102b) from which the state information was received. In this way, the policy management engine 110 may build and maintain a record of application state and network configuration information from various systems over time.

The policy management engine 110 may include or otherwise have access to a set of policies 118, which may be stored in the remote system 112. In general, each of the policies 118 specifies both a source application and a destination application, and indicates that the source application is authorized (or not authorized) to communicate with the destination application. A policy may specify, for the source and/or destination application, any number of additional attributes of the source and/or destination application, such as any one or more of the following, in any combination: user(s) who are executing the application (identified, e.g., by username, group membership, or other identifier), system(s), network subnet, and time(s). A policy may identify its associated source and/or destination application using an application fingerprint which may, for example, identify the application by its name and any other attribute(s) which may be used to authenticate the validity and identify of an application, such as any one or more of the following in any combination: filename, file size, cryptographic hash of contents, and digital code signing certificates associated with the application. An application fingerprint in a policy may include other information for its associated source and/or destination application, such as the IP address and port used by the application to communicate, whether or not such information is used to define the application.

The policy management engine 118 provides, to one or more systems in the system 100 (e.g., the source system 102a and destination system 102b), policy data, obtained and/or derived from the policies, representing some or all of the policies that are relevant to the system to which the policy data is transmitted, which may include translating applications into IP address/port combinations (FIG. 2A, operation 206). For example, the policy management engine 110 may identify a subset of the policies 118 that are relevant to the source system 102a and transmit a communication 120 representing the identified subset of policies to the source system 102a. The source system 114a may receive the communication 120 and store source system policy data 124a, representing the received policies, in the source system 102a. Similarly, the policy management engine 110 may identify a subset of the policies 118 that are relevant to the destination system 102b and transmit a communication 122 representing the identified subset of policies to the destination system 102b. The destination system 114b may receive the communication 122 and store destination system policy data 124b, representing the received policies, in the destination system 102b.

The policy management engine 110 may identify the subset of the policies 118 that are relevant to a particular system (e.g., the source system 102a and/or the destination system 102b) in any of a variety of ways. For example, the policy management engine 110 may identify a policy as relevant to a system if the policy refers to an IP address of the system or an application that is installed and/or executing on the system.

The policy management engine 110 may extract the policy data that is relevant to the systems 102a and 102b and transmit the resulting policy data communications 120 and 122 in response to any of a variety of triggers. For example, the policy management engine 110 may extract and transmit relevant policy data (in the form of instances of the communications 120 and 122) to the systems 102a and 102b:
  periodically (e.g., every second, every minute, or at any scheduled times);
  in response to a change in the master policy data;
  in response to a change in network topology, e.g., an assignment of a network address to one of the systems 102a-b or a change in an assignment of an existing address;
  in response to a new application executing on one of the systems 102a-b;
  in response to an existing application in the system 100 changing or adding a port on which it is listening for connections;
  in response to an unexpected condition on systems 102a-b or other systems in the network.

The policy management engine 110 may only transmit updated policy data to one of the systems 102a and 102b if the updates are relevant to that system. Regardless of the trigger, in response to receiving the relevant policy data 120 and 122, the systems 102a and 102b may update their local policy data 124a and 124b in accordance with the received communications 120 and 122, respectively. Receiving and maintaining updated copies of relevant policy data enables local systems, such as the systems 102a and 102b, to apply the policies that are relevant to them without the need to communicate with a remote system or component, such as the remote system 112 or policy management engine 110.

Before describing the system 100 and methods 200a-c in more detail, it will be useful to note that the system 100 may operate in one of at least three security modes in relation to any particular connection between two applications (e.g., the source application 104a and the destination application 104b):
  (1) Optimistic: The connection between the two applications is allowed unless and until the reconciliation engine 128 instructs the agents associated with those applications to terminate the connection due to a policy violation.
  (2) Pessimistic: The connection between the two applications is terminated after a specified amount of time has passed if the reconciliation engine 128 does not affirmatively instruct the agents associated with those applications to keep the connection alive.
  (3) Blocking: The connection between the two applications is blocked unless and until the reconciliation engine 128 affirmatively instructs the agents associated with those applications to allow the connection.

Note that the system 100 may, but need not, operate in the same security mode for all connections within the system 100. The system 100 may, for example, operate in optimistic security mode for some connections, operate in pessimistic security mode for other connections, and operate in blocking security mode for yet other connections. As yet another example, the system 100 may switch from one mode to another for any given connection or set of connections in response to detected conditions, as will be described in more detail below.

Figure 2B:
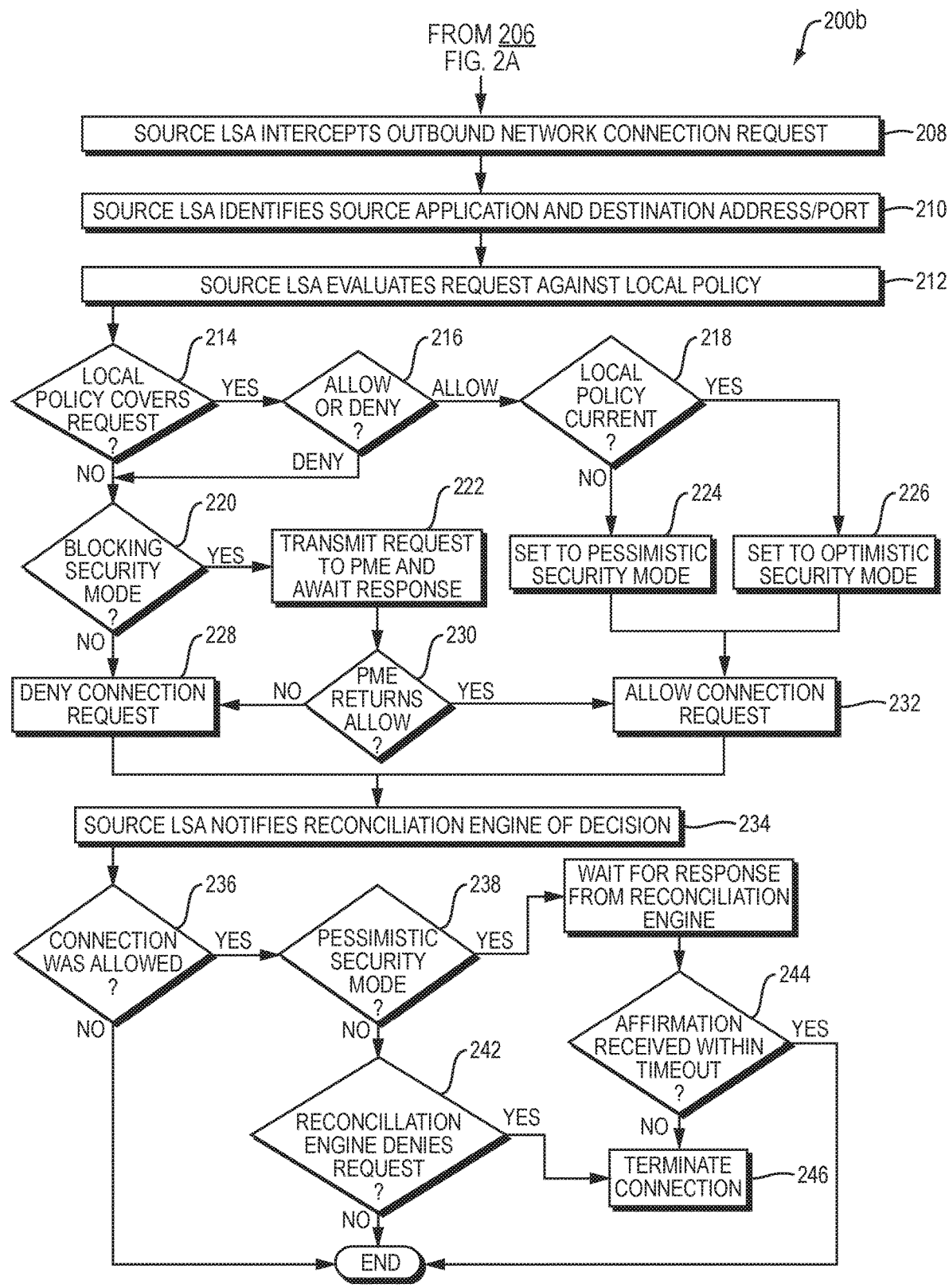

Referring now to FIG. 2B, a flowchart is shown of a method 200b that is performed by the source local security agent 106a in one embodiment of the present invention to process an outgoing connection request. Note that although the method 200b of FIG. 2B may be performed following the method 200a performed by the policy management agent 110 in FIG. 2A, this is merely an example and not a requirement of the present invention. Rather, the method 200b of FIG. 2B (and the method 200c of FIG. 2C) may operate independently of the method 200a of FIG. 2A.

Now consider an example in which the source application 104a makes a network request to communicate with the destination application 104b. Although this particular example will be described in connection with this particular request, the techniques disclosed herein may be applied more generally to any request made by any application to communication with any other application.

The local security agent that is on the same system as the requesting application, which in this example is the local security agent 106a that is on the same system 102a as the requesting application 104a, detects that the requesting application 104a has made the communication request, intercepts the request, and blocks the request from proceeding further at least until the source local security agent 106a has evaluated whether the request matches a local policy (FIG. 2B, operation 208). The local security agent 106a identifies, based on the request, the application 104a that is the source of the request (FIG. 2B, operation 210). The local security agent 106a evaluates the request against the locally stored policies 124a in order to determine whether to allow or deny the request based on any one or more of the following, in any combination: the identity of the source application 104a, the IP address and port of the destination application 104b, some or all of the contents of the request, and the local policy data 124a (FIG. 2B, operation 212).

The local security agent 106a determines, based on its evaluation, whether one of the local policies 124a covers the communication request (FIG. 2B, operation 214). If one of the local policies 124a does cover the request, then the local security agent 106a determines whether the covering policy allows or denies the request (FIG. 2B, operation 216). If the covering policy allows the request, then the local security agent 106a determines whether the covering policy is current (FIG. 2B, operation 218). The local security agent 106a may determine whether the covering policy is current in any of a variety of ways. For example, in certain embodiments, the policy management engine 110 may inform the local security agent 106a that particular policies are current or not current. The local security agent 106a may treat any particular policy as current in response to being informed by the policy management engine 110 that the policy is current, unless and until the policy management engine 110 subsequently informs the local security agent 106a that the policy is no longer current. As another example, the local security agent 106a may convert the status of a policy from current to not current after some predetermined amount of time has passed from when the local security agent 106a previously set the status of the policy to current.

If the covering policy is current, then the local security agent 106a sets its security mode to optimistic mode (FIG. 2B, operation 226); otherwise, the local security agent 106a sets its current security mode to pessimistic security mode (FIG. 2B, operation 224). If the covering policy allows the request, then the local security agent 106a allows the request (FIG. 2B, operation 232), regardless of whether the local policy is current.

If, in operation 232 of FIG. 2B, the local security agent 106a decides to allow the communication request, then, in general, the local security agent 106a allows the communication request to be transmitted to the destination application 104b. Such transmission may occur using traditional techniques. In other words, the local security agent 106a may unblock the communication request and permit it to be transmitted normally.

If, in operation 214, the local security agent 106a determines that none of the local policies 124a covers the request, or, in operation 216, the local security agent 106a determines that the covering policy denies the request, then the local security agent 106a determines whether its current security mode is blocking security mode (FIG. 2B, operation 220). Furthermore, note that the local policies 124a may include a policy which specifically indicates the action to be performed if none of the local policies 124a covers the request. If the local policies 124a include such a policy, then the local security agent 106a may perform the action specified by that policy if the local security agent 106a determines that none of the local policies 124a covers the request.

If the local security agent 106a's current security mode is blocking security mode, then the local security agent 106a transmits the request to the policy management engine 110 and awaits a response from the policy management engine 110 (FIG. 2B, operation 222). The policy management engine 110 then evaluates the request against the central policies 118 and sends a response to the local security agent 106a indicating whether the request should be allowed or denied, based on the central policies 118. The local security agent 106a receives the response 120 from the policy management engine 110 and determines whether the response 120 indicates that the request should be allowed or denied (FIG. 2B, operation 230). If the response 120 from the policy management engine 110 indicates that the request 130 should be allowed, then the local security agent 106a allows the connection request (FIG. 2B, operation 232); otherwise, the local security agent 106a denies the connection request (FIG. 2B, operation 228). The local security agent 106a also denies the connection request (FIG. 2B, operation 228) if, in operation 220, the local security agent 106a determines that its current security mode is not blocking security mode.

Regardless of whether the local security agent 106a allows or denies the request (FIG. 2B, operations 232 or 228), the local security agent 106a notifies a reconciliation engine 128 on the remote system 112 of the decision, such as by transmitting a communication 126 to the reconciliation engine 128 (FIG. 2B, operation 234). The communication 126 may include any of a variety of information, such as data representing one or more of the following: the identity of the source application 104a, the destination IP address and port, and the decision made by the local security agent 106a (e.g., allow or deny). The reconciliation engine 128 may receive and store the communication 126 in any of the ways disclosed herein in connection with the receipt and storage of the communication 114 by the policy management engine 110.

The local security agent 106a may or may not wait to receive a response from the reconciliation engine 128 before proceeding, depending on the local security agent 106a's current security mode. More specifically, the local security agent 106a determines whether it previously denied the connection request 130 in operation 228 or allowed the connection request 130 in operation 232 (FIG. 2B, operation 236). If the connection request 130 was denied, not allowed, the local security agent does not take any further action.

If, instead, the connection request was allowed and was accepted by the destination system 102b, then the local security agent 106a determines whether it is currently operating in pessimistic security mode (FIG. 2B, operation 238). If the local security agent 106a is currently operating in pessimistic security mode, then the local security agent 106a waits to receive a response from the reconciliation engine 128 (FIG. 2B, operation 240). If the local security agent 106a does not receive a response within some predetermined timeout period or receives a response indicating the connection does not reconcile with current policies (FIG. 2B, operation 244), then the local security agent 106a terminates the connection (FIG. 2B, operation 246). If the local security agent 106a receives a response that confirms the connection reconciles with current policy, the local security agent 106a leaves the connection active by not taking any action.

If the local security agent 106a is not currently operating in pessimistic security mode (FIG. 2B, operation 238), then, if the response received by the local security agent 106a from the reconciliation engine 128 denies the request, then the local security agent 106a terminates the connection (FIG. 2B, operation 246). If, in operation 242, the reconciliation engine 128 allows the request, the local security agent 106a leaves the connection active by not taking any action.

Figure 2C:
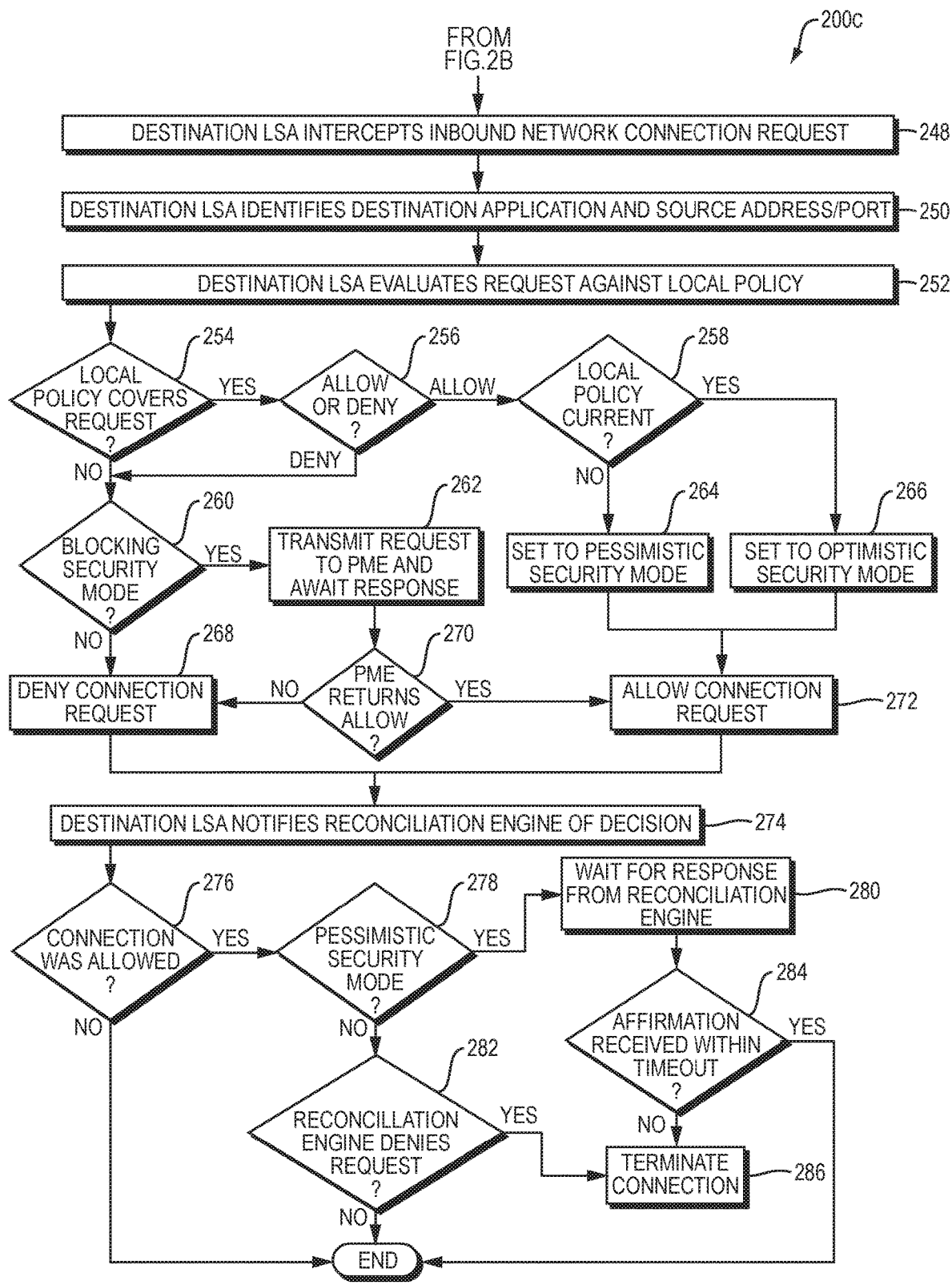

Referring now to FIG. 2C, a flowchart is shown of a method 200c that is performed by the destination local security agent 106b in one embodiment of the present invention to process the incoming connection request 130 from the source application 104a. Note that although the method 200c of FIG. 2C is illustrated as being performed after the method 200b performed by the source local security agent 106a in FIG. 2A, this is merely an example and not a requirement of the present invention. For example, the method 200c of FIG. 2C may begin before the method 200b of FIG. 2B has completed. As a particular example, the method 200c of FIG. 2C may begin after the source local security agent 106a transmits the connection request 130 to the destination system 102b, and before the remainder of the method 200b completes.

The destination local security agent 106b intercepts the inbound connection request 130 transmitted by the source local security agent 106a, and blocks the request from proceeding further at least until the destination local security agent 106b has evaluated whether the request 130 matches a local policy (FIG. 2C, operation 248). The local security agent 10ba identifies, based on the request, the application 104b that is the destination of the request (FIG. 2C, operation 250). The local security agent 106b evaluates the request 130 against the locally stored policies 124b in order to determine whether to allow or deny the request 130 based on any one or more of the following, in any combination: the identity of the destination application 104b, the IP address and port of the source application 104a, some or all of the contents of the request 130, and the local policy data 124b (FIG. 2C, operation 252).

The local security agent 106b determines, based on its evaluation, whether one of the local policies 124b covers the communication request 130 (FIG. 2C, operation 254). If one of the local policies 124b does cover the request, then the local security agent 106b determines whether the covering policy allows or denies the request (FIG. 2C, operation 256). If the covering policy allows the request, then the local security agent 106b determines whether the covering policy is current (FIG. 2C, operation 258). The local security agent 106b may determine whether the covering policy is current in any of a variety of ways. For example, in certain embodiments, the policy management engine 110 may inform the local security agent 106b that particular policies are current or not current. The local security agent 106b may treat any particular policy as current in response to being informed by the policy management engine 110 that the policy is current, unless and until the policy management engine 110 subsequently informs the local security agent 106b that the policy is no longer current. As another example, the local security agent 106b may convert the status of a policy from current to not current after some predetermined amount of time has passed from when the local security agent 106b previously set the status of the policy to current.

If the covering policy is current, then the local security agent 106b sets its security mode to optimistic mode (FIG. 2C, operation 266); otherwise, the local security agent 106b sets its current security mode to pessimistic security mode (FIG. 2C, operation 264). If the covering policy allows the request 130, then the local security agent 106b allows the request 130 (FIG. 2C, operation 272), regardless of whether the local policy is current.

If, in operation 272 of FIG. 2C, the local security agent 106a decides to allow the communication request 130, then, in general, the local security agent 106b allows the communication request 130 to be provided to the destination application. In other words, the local security agent 106b may unblock the communication request 130 so that it may be received by the destination application 104b.

If, in operation 254, the local security agent 106b determines that none of the local policies 124b covers the request 130, or, in operation 256, the local security agent 106b determines that the covering policy denies the request 130, then the local security agent 106b determines whether its current security mode is blocking security mode (FIG. 2C, operation 260). If the local security agent 106b's current security mode is blocking security mode, then the local security agent 106b transmits the request 130 to the policy management engine 110 and awaits a response from the policy management engine 110 (FIG. 2C, operation 262). The policy management engine 110 then evaluates the request 130 against the central policies 118 and sends a response to the local security agent 106b indicating whether the request should be allowed or denied, based on the central policies 118. The local security agent 106b receives the response 122 from the policy management engine 110 and determines whether the response 122 indicates that the request 130 should be allowed or denied (FIG. 2C, operation 270). If the response 122 from the policy management engine 110 indicates that the request 130 should be allowed, then the local security agent 106b allows the connection request 130 (FIG. 2C, operation 272); otherwise, the local security agent 106b denies the connection request 130 (FIG. 2C, operation 268). The local security agent 106b also denies the connection request 130 (FIG. 2C, operation 268) if, in operation 260, the local security agent 106b determines that its current security mode is not blocking security mode.

Regardless of whether the local security agent 106b allows or denies the request 130 (FIG. 2B, operations 272 or 268), the local security agent 106b notifies the reconciliation engine 128 on the remote system 112 of the decision, such as by transmitting a communication 132 to the reconciliation engine 128 (FIG. 2C, operation 274). The communication 132 may include any of a variety of information, such as data representing one or more of the following: the identity of the destination application 104b, the source IP address and port, and the decision made by the local security agent 106b (e.g., allow or deny). The reconciliation engine 128 may receive and store the communication 132 in any of the ways disclosed herein in connection with the receipt and storage of the communication 114 by the policy management engine 110.

The local security agent 106b may or may not wait to receive a response from the reconciliation engine 128 before proceeding, depending on the local security agent 106b's current security mode. More specifically, the local security agent 106b determines whether it previously denied the connection request 130 in operation 268 or allowed the connection request 130 in operation 272 (FIG. 2C, operation 276). If the connection request 130 was denied, not allowed, the local security agent does not take any further action and the destination application 104b does not receive the request.

If, instead, the connection request was allowed and was accepted by the destination application 104b, then the local security agent 106b determines whether it is currently operating in pessimistic security mode (FIG. 2C, operation 278). If the local security agent 106b is currently operating in pessimistic security mode, then the local security agent 106b waits to receive a response from the reconciliation engine 128 (FIG. 2C, operation 270). If the local security agent 106b does not receive a response within some predetermined timeout period or receives a response indicating the connection does not reconcile with current policies (FIG. 2C, operation 274), then the local security agent 106b terminates the connection (FIG. 2C, operation 266). If the local security agent 106b receives a response that confirms the connection reconciles with current policy, the local security agent 106b leaves the connection active by not taking any action.

If the local security agent 106b is not currently operating in pessimistic security mode (FIG. 2C, operation 278), then, if the response 136 received by the local security agent 106b from the reconciliation engine 128 denies the request, then the local security agent 106b terminates the connection (FIG. 2C, operation 286). If, in operation 282, the reconciliation engine 128 allows the request, the local security agent 106b leaves the connection active by not taking any action.

As described above, the source and destination local security agents 106a-b notify the reconciliation engine 128 of their decisions regarding the connection request, in operation 234 of FIG. 2B and operation 274 of FIG. 2C, respectively. The reconciliation engine 128, in response to receiving the communication 126 from the source local security agent 106a and the communication 132 from the destination local security agent 106b, collates the data from the two communications 126 and 132 and determines, based on the collated data, whether the collated data indicates that the communication matches any of the policies 118. The reconciliation engine 128 then notifies both the source local security agent 106a and the destination local security agent 106b of its decision, via communications 134 and 136, respectively. The ways in which the source and destination local security agents 106a-b process the communications 134 and 136 are described above in connection with operations 240/242 and 280/282 of FIGS. 2B and 2C, respectively.

The net effect of the method 200 shown in FIGS. 2A-2C is that:

the source local security agent 106a makes an informed decision about whether to allow or deny the connection request based on the information available to it at the time;

if the connection is allowed, the destination local security agent 106b makes an informed decision about whether to allow or deny the request based on the information available at the time;

if both the source and destination local security agents 106a-b allow the communication request, then the reconciliation engine 128 attempts to confirm the decisions of the source and destination local security agents 106a and may either reaffirm those decisions or override them.

A specific example of an application of the system 100 of FIG. 1 and the methods 200a-c of FIGS. 2A-2C will now be described. Assume that the source application 104a is an application named "WebApp" and that the source system 102a has the IP address 192.168.1.1. Further assume that the destination application 104b is an application named "Database" and that the destination system 102b has the IP address 192.168.1.2, and that the "Database" is listening on port 3306. Further assume that the policies 118 include a policy which indicates that the "Database" application is permitted to receive connections from "WebApp" source applications.

The local security agent 106a reports to the policy management engine that it is running application "WebApp" and that its system has an IP address of 192.168.1.1 (communication 114). The local security agent 106b reports to the policy management engine 110 that the application "Database" is running and it is listening on IP address 192.168.1.2, port 3306 (communication 116). The policy management engine 110 informs the source local security agent 106a that application "WebApp" may communicate with 192.168.1.2 over port 3306 (communication 120). The policy management engine 110 informs the destination local security agent 106b that application "Database" may receive communication from 192.168.1.1 (communication 114).

The "WebApp" application initiates a connection request to IP address 192.168.1.2, port 3306. Because this matches a local policy that was received from the policy management engine 110, the local security agent 106a uses the techniques disclosed above to allow the connection request 130 to be transmitted to the destination system 102b and to inform the reconciliation engine that the application named "WebApp" that is executing has initiated a connection request from IP address 192.168.1.1 to IP address 192.168.1.2, port 3306.

On the destination system 102b, IP address 192.168.1.2 on port 3306 receives an inbound request from IP address 192.168.1.1. Because this matches a local policy that was received from the policy management engine 110, the destination local security agent 106b uses the techniques disclosed above to receive the connection request 130, to allow the connection request 130 to be provided to the "Database" application, and to informs the reconciliation engine 128 that the application named "Database" that is executing and listening on IP address 192.168.1.2, port 3306, has received a connection request from IP address 192.168.1.1.

The reconciliation engine 128 collates the information it has received from the source and destination local security agents 106a-b, using any of a variety of data in the received information (e.g., timestamp and/or packet header information). In this example, there are two pieces of information: "'WebApp' requested an outbound connection from 192.168.1.1 to 192.168.1.2:3306" and "'Database' listening on 192.168.1.2:3306 received an inbound connection request from 192.168.1.1". The result of this collation is a conclusion by the reconciliation engine 128 that an application named "WebApp" is attempting to make a connection from 192.168.1.1 to an application named "Database" on 192.168.1.2, port 3306. The reconciliation engine 128 determines that this connection request matches the policy which indicates that the "Database" application is permitted to receive connections from "WebApp" applications and, in response to this determination, sends a positive confirmation back to the source local security agent 106a and the destination local security agent 106b, indicating that the requested connection satisfies the policies 118. In response to receiving these confirmations, the source and destination local security agents 106a-b take no further action.

Although in the embodiment of FIGS. 1 and 2A-2B, the reconciliation engine 128 notifies both the source local security agent 106a and the destination local security agent 106b, via the communications 134 and 136, of the reconciliation engine 128's policy decision in relation to the request 130, alternatively the reconciliation engine 128 may only notify one of the local security agents 106a and 106b. For example, if the reconciliation engine 128 notifies the source local security agent 106a that the request 130 violates one of the policies 118 either before or after the request 130 has been transmitted to the destination application 104b on the destination system 102b, then the source local security agent 106a may, in response to such a notification, either not provide the request 130 to, or terminate the connection if already established with, the destination system 102b. As a result, it would not be necessary for the reconciliation engine 128 to notify the destination local security agent 106b of the policy violation in order to prevent a connection from being established between the source application 104a and the destination application 104b.

Similarly, if the reconciliation engine 128 notifies the destination local security agent 106b that the request 130 violates one of the policies 118, even after the source local security agent 106a has transmitted the request 130 to the destination system 102b, then the destination local security agent 106b may, in response to such a notification, either deny the request 130 and not provide the request 130 to the destination application 104b, or terminate the connection if it has already been allowed. As a result, it would not be necessary for the reconciliation engine 128 to notify the source local security agent 106a of the policy violation in order to prevent a connection from being established between the source application 104a and the destination application 104b.

Furthermore, although both the source system 102a and the destination system 102b in FIG. 1 have their own local security agents 106a and 106b, respectively, this is merely an example and does not constitute a limitation of the present invention. Alternatively, for example, only one of the two systems 102a and 102b may have a local security agent. As particular examples, the source system 102a may have its local security agent 106a, while the destination system 102b may omit the local security agent 106b. Conversely, the destination system 102b may have its local security agent 106b, while the source system 102a may omit its local security agent 106a. Although in these embodiments only one of the two systems 102a and 102b, and the reconciliation engine 128, may validate the communication request against the central policies 118 and one of the local policies 124a and 124b, such embodiments still provide the benefit of some validation, even if less than in the full system 100 employing three-part validation shown in FIG. 1.

Although the policy management engine 110 is shown in FIG. 1 as being separate and remote from the source system 102a and the destination system 102b, this is merely an example and not a limitation of the present invention. More generally, the policy management engine 110 may be implemented in any one or more of the following ways, in any combination:

- as a single component, located remotely from and network-accessible to, the source system 102a and destination system 102b, as shown in FIG. 1;
- as a plurality of components which are partially or entirely redundant, located remotely from and network-accessible to, the source system 102a and destination system 102b;
- as a single component located within one of the source and destination systems 102a and 102b, respectively, and network-accessible to the other systems; and
- as a plurality of components which are partially or entirely redundant and location within one or more of the source and destination systems 102a and 102b, and optionally network-accessible to the other systems.

Similarly, although the reconciliation engine 128 is shown in FIG. 1 as being separate and remote from the source system 102a and the destination system 102b, this is merely an example and not a limitation of the present invention. More generally, the reconciliation engine 128 may be implemented in any of the ways described above in connection with the policy management engine 110.

Although the local security agents 106a and 106b are shown in FIG. 1 as being contained solely within the respective source and destination systems 102a and 102b, this is merely an example and not a limitation of the present invention. Each of the local security agents 106a and 106b may perform three functions: (1) gathering information about applications executing on the same system (e.g., applications 104a and 104b) and the listening ports against which these applications may be bound; (2) gathering information about the network addresses available on the same system, and (3) enforcing the local policies 124a and 124b. Any of the local security agents 106a and 106b in the systems 102a and 102b may perform any, but not all of these functions, in which case the function not performed locally by the local security agent may be performed remotely by another component not contained within the same system as the local security agent. As one particular example, the local security agent 106a in the source system 102a may perform the functions of gathering information about applications executing on the source system 102a (e.g., source application 104a) and the network addresses available on the source system, but not perform the function of executing local policies 124a, which may be performed by another component (such as a firewall configured to perform the policy enforcement functions disclosed herein) that is not in the source system 102a. As yet another example, all of the functions of gathering application and network address information and policy enforcement may be performed remotely from the system (e.g., systems 102a and 102b) to which those functions are applied.

The description herein refers to blocking or not allowing network connections to be created, and to terminating existing network connections, in response to determining that a policy would be or has been violated. Such blocking/terminating may be applied to: (1) the specific connection that would violate or has violated a policy; (2) all connections that originate from the same source as a connection that would violate or has violated a policy, and which exist or have been requested at the time the policy violation has been detected; (3) all connections that originate from the same source as a connection that would violate or has violated a policy, including both connections that exist or have been requested at the time the policy violation has been detected, and connections requested in the future (possibly until some time limit has been reached or some other condition has been satisfied); and (4) throttling connections originating from the same source as the connection that has been determined to violate the policy.

Although certain embodiments have been described herein as being applied to a request to establish a network connection (such as the request 130), this is merely an example and not a limitation of the present invention. Alternatively or additionally, embodiments of the present invention may apply the techniques disclosed herein to all content (e.g., every packet) communicated within an existing connection, or to selected content (e.g., periodically sampled packets) within an existing connection.

Figure 3:
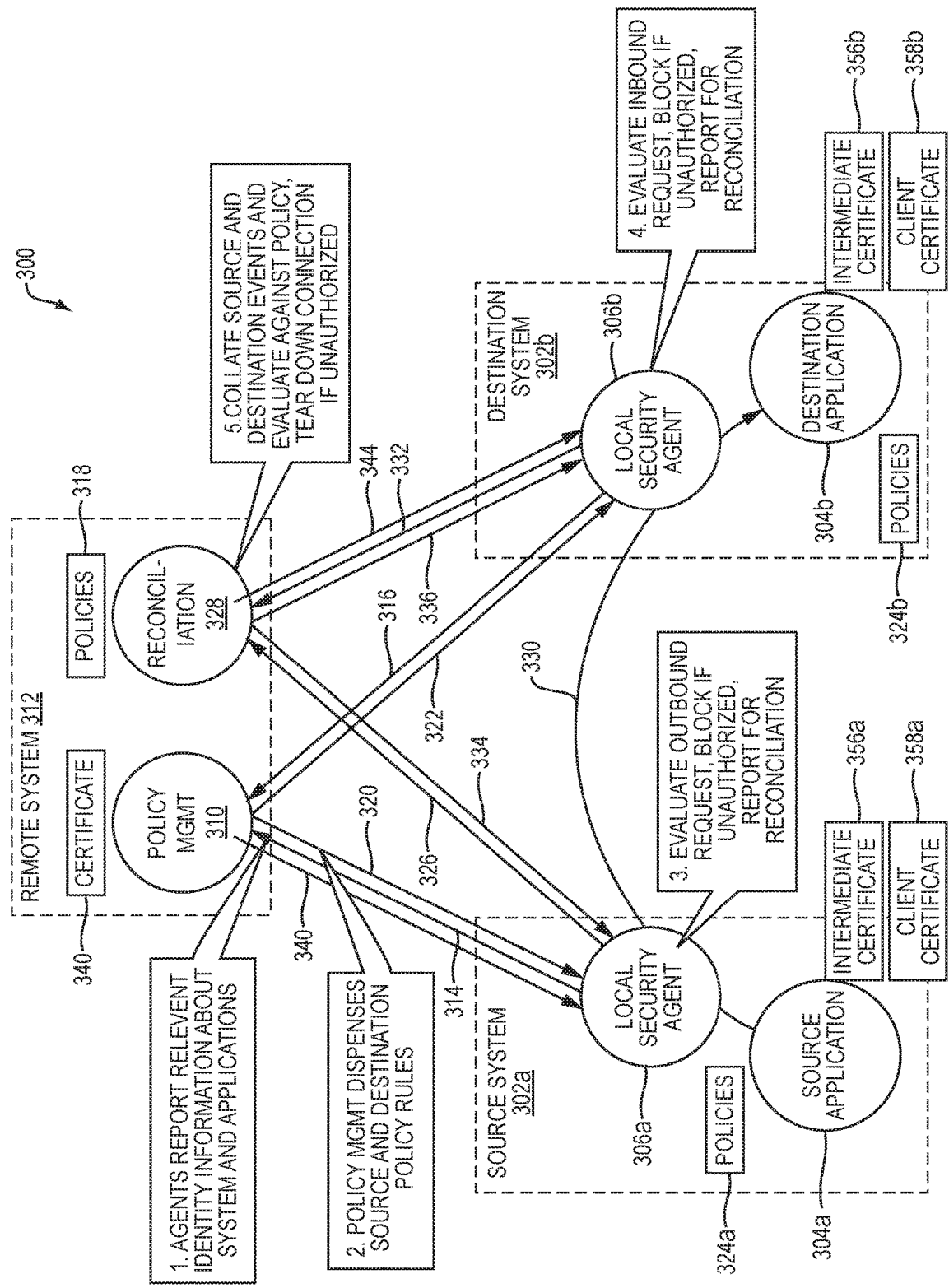
FIG. 3 is a dataflow diagram of a system for performing symmetrical validation of communications between applications over a network without using a backend system for policy enforcement according to one embodiment of the present invention.
Figure 4A:
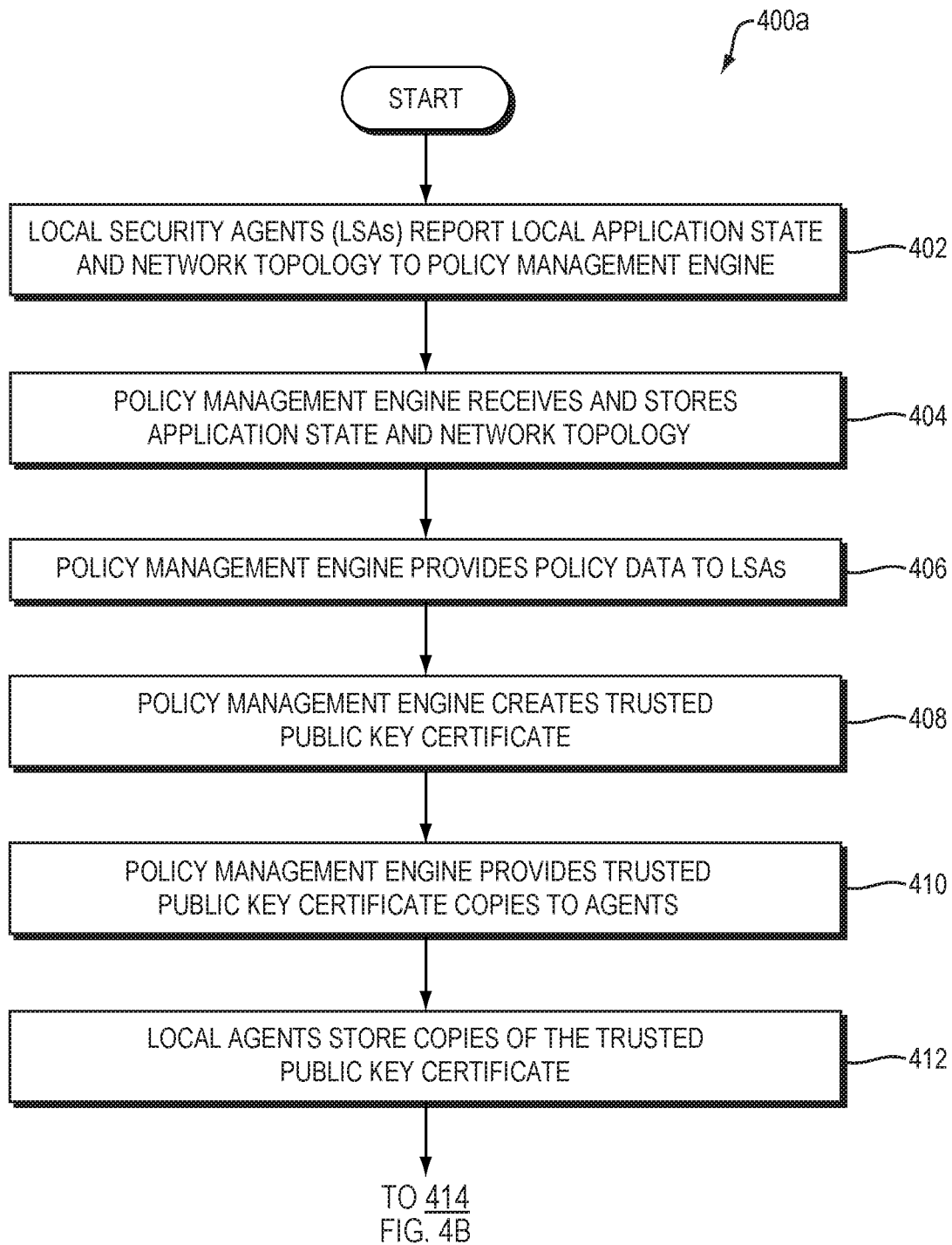

Referring to FIG. 3, a dataflow diagram is shown of a system 300 for performing symmetrical validation of communication between applications over a network. Referring to FIG. 4A, a flowchart is shown of a method 400a performed by a policy management engine 310 according to one embodiment of the present invention.

The system 100 includes a source system 302a and a destination system 302b. The source system 302a of FIG. 3 may have any of the properties disclosed herein in connection with the source system 102a of FIG. 1. Similarly, the destination system 302b of FIG. 3 may have any of the characteristics disclosed herein in connection with the destination system 102a of FIG. 3.

The source system 302a includes a source application 304a (which may, for example, be installed and executing on the source system 302a) and the destination system 302b includes a destination application 304b (which may, for example, be installed and executing on the destination system 302b). The source application 304a of FIG. 3 may have any of the characteristics disclosed herein in connection with the source application 104a of FIG. 1. Similarly, the destination application 304b of FIG. 3 may have any of the characteristics disclosed herein in connection with the destination application 104b of FIG. 1.

An embodiment will now be described for enforcing security policies on a communication that the source system 302a attempts to initiate with the destination system 302b.

In this embodiment, the source system 302a includes a local security agent 306a (which may have any of the characteristics of the local security agent 106a of FIG. 1) and the destination system 302b includes a local security agent 306b (which may have any of the characteristics of the local security agent 106b of FIG. 1).

The system 300 also includes a policy management engine 310, which may have any of the characteristics of the policy management engine 110 of FIG. 1. Some or all of the local security agents 306a-b may report the state of the local applications as well as the state of the network on their system to the policy management engine 310 (FIG. 4A, operation 402), such as in any of the ways disclosed herein in connection with operation 202 of FIG. 2A.

Similarly, the local security agent 306b on the destination system 302b may obtain and transmit state information for the destination application 304b (and for any other applications executing on the destination system 302b) and for the network configuration information of destination system 103b and transmit such information via communication 316 to the policy management engine 310 in any of the ways disclosed above in connection with the local security agent 306a, the source system 302a, the source application 304a, and the communication 314.

The policy management engine 310 may receive the transmitted state information 314 and 316 and store some or all of it in any suitable form (FIG. 4A, operation 404), such as in any of the ways disclosed herein in connection with operation 204 of FIG. 2A.

The policy management engine 310 may include or otherwise have access to a set of policies 318, which may be stored in the remote system 312. In general, each of the policies 318 specifies both a source application and a destination application, and indicates that the source application is authorized (or not authorized) to communicate with the destination application. The policies 318 may have any of the characteristics disclosed herein in connection with the policies 118 of FIG. 1.

The policy management engine 310 provides, to one or more systems in the system 300 (e.g., the source system 302a and destination system 302b), policy data, obtained and/or derived from the policies, representing some or all of the policies that are relevant to the system to which the policy data is transmitted, which may include translating applications into IP address/port combinations (FIG. 4A, operation 406), such as in any of the ways disclosed herein in connection with operation 206 of FIG. 2A.

Like the system 100 of FIG. 1, the system 300 of FIG. 3 may operate in an Optimistic, Pessimistic, or Blocking security modes, which are described in more detail above.

The policy management engine 310 creates a trusted public key certificate 340 (such as an X.509 root certificate) (FIG. 4A, operation 408). The policy management engine 310 distributes (via communications 342 and 344) copies of the certificate 340 to the agents 306a and 306b, respectively (FIG. 4A, operation 410). The agents 306a and 306b store their copies of the certificate 340 as certificate copies 356a and 356b, respectively (FIG. 4A, operation 412).

Although X.509 is provided above as an example of a public key certificate infrastructure, this is merely an example and not a limitation of the present invention. Other public key certificate infrastructures may be used. One benefit of X.509 is that it allows a host or website to create a document that proves the ownership of a public key. It used public-key encryption to guarantee that the document is valid. In addition to identity, the certificate may include other information. As described below, embodiments of the present invention may use the information in the X.509 certificate to create a "web of trust" among the agents 106a-b, so that they can trust the information they have received from a (putative) other agent and act on it.

Figure 4B:
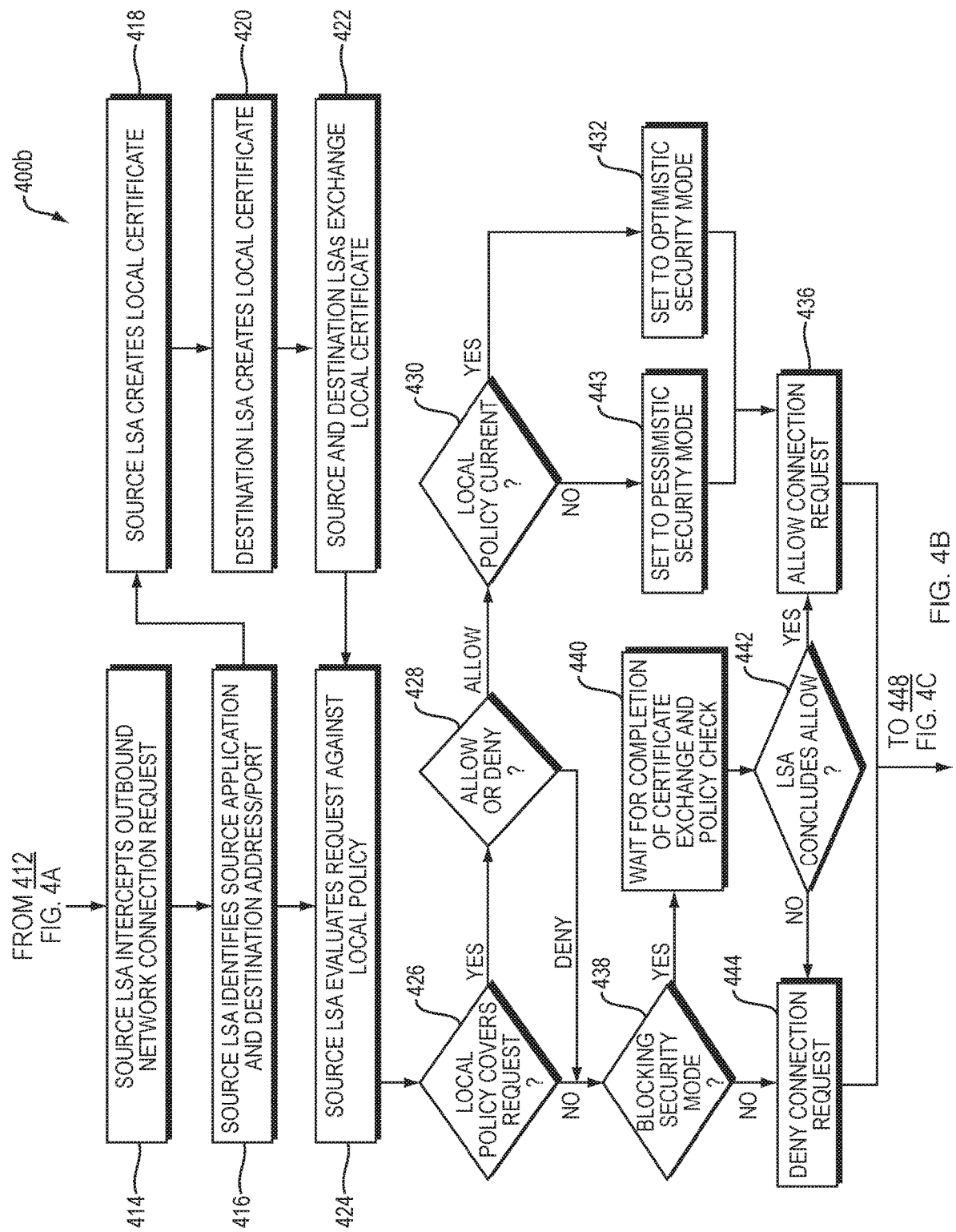

Referring now to FIG. 4B, a flowchart is shown of a method 400b that is performed by the source local security agent 306a in one embodiment of the present invention to process an outgoing connection request. Note that although the method 400b of FIG. 4B may be performed following the method 400a performed by the policy management agent 310 in FIG. 4A, this is merely an example and not a requirement of the present invention. Rather, the method 400b of FIG. 4B (and the method 400c of FIG. 4C) may operate independently of the method 400a of FIG. 4A.

Now consider an example in which the source application 304a makes a network request to communicate with the destination application 304b. Although this particular example will be described in connection with this particular request, the techniques disclosed herein may be applied more generally to any request made by any application to communication with any other application.

The local security agent that is on the same system as the requesting application, which in this example is the local security agent 306a that is on the same system 302a as the requesting application 304a, detects that the requesting application 304a has made the communication request, intercepts the request, and blocks the request from proceeding further at least until the source local security agent 306a has evaluated whether the request matches a local policy (FIG. 4B, operation 414). The local security agent 306a identifies, based on the request, the application 304a that is the source of the request (FIG. 4B, operation 416).

Recall that the local security agents 306a-b have already received and stored intermediate signing certificates 356a-b, respectively, from the policy management engine 310. The policy management engine 310 is a source that is trusted a priori by both of the local security agents 306a-b. Furthermore, the intermediate certificates 356a-b are derived from common root certificate 340, which is known only to the policy management engine 310.

After the source local security agent 306a intercepts the outgoing communication request, the source local security agent 306a creates its own local certificate 358a, referred to herein as a "client certificate," based on the local intermediate certificate 356a (FIG. 4B, operation 418). In general, the client certificate 358a extends the certificate chain and trustworthiness of the intermediate certificate 356a. For example, the local security agent 306a may create the client certificate 358a based on the intermediate certificate 356a by adding, to the intermediate certificate 356a: (1) identifying metadata of the source system 302a on which the local security agent 306a resides; and (2) application fingerprint information for the source application 304a.

Similarly, the destination local security agent 306b creates its own local client certificate 358b based on the local intermediate certificate 356b (FIG. 4B, operation 420). In general, the client certificate 358b extends the certificate chain and trustworthiness of the intermediate certificate 356b. For example, the local security agent 306b may create the client certificate 358b based on the intermediate certificate 356b by adding, to the intermediate certificate 356b: (1) identifying metadata of the destination system 302b on which the local security agent 306b resides; and (2) application fingerprint information for the destination application 304b.

The local security agents 306a-b then exchange their respective client certificates 358a-b, such as by using the mTLS protocol (FIG. 4B, operation 422).

The client certificates 358a-b are based on the root certificate 340. The root certificate 340 has already been signed by the policy management engine 310, and also received by the security agents 306a-b, and this ends the involvement of the policy management engine 310. Because the root certificate 340 includes a cryptographic signature, proving it originates from the backend (e.g., the policy management engine 310), the client certificates 358a-b, which extend the root certificate 340, are also trusted just as the root certificate 340 is trusted. When the client certificates 358a-b are exchanged, the receiver of the client certificate can trust that the sender possesses a root certificate and hence that the information it sends may be trusted.

Both of the local security agents 306a-b then have the information required to decide whether their local policies 324a-b, respectively, will allow (or refuse) the communication request from the source application 304a, without the involvement of the remote system 312. Specific examples of techniques for making the allow/refuse decision will now be described.

The local security agent 306a evaluates the request against the locally stored policies 324a in order to determine whether to allow or deny the request based on any one or more of the following, in any combination: the identity of the source application 304a, the IP address and port of the destination application 304b, some or all of the contents of the request, and the local policy data 324a (FIG. 4B, operation 424).

The local security agent 306a determines, based on its evaluation, whether one of the local policies 324a covers the communication request (FIG. 4B, operation 426). If one of the local policies 324a does cover the request, then the local security agent 306a determines whether the covering policy allows or denies the request (FIG. 4B, operation 428). If the covering policy allows the request, then the local security agent 306a determines whether the covering policy is current, such as in any of the ways disclosed above in connection with FIG. 2B (FIG. 4B, operation 430).

If the covering policy is current, then the local security agent 306a sets its security mode to optimistic mode (FIG. 4B, operation 432); otherwise, the local security agent 306a sets its current security mode to pessimistic security mode (FIG. 4B, operation 434). If the covering policy allows the request, then the local security agent 306a allows the request (FIG. 4B, operation 436), regardless of whether the local policy is current.

If, in operation 428 of FIG. 4B, the local security agent 306a decides to allow the communication request, then, in general, the local security agent 306a allows the communication request to be transmitted to the destination application 304b. Such transmission may occur using traditional techniques. In other words, the local security agent 306a may unblock the communication request and permit it to be transmitted normally.

If, in operation 426, the local security agent 306a determines that none of the local policies 324a covers the request, or, in operation 428, the local security agent 306a determines that the covering policy denies the request, then the local security agent 306a determines whether its current security mode is blocking security mode (FIG. 4B, operation 438). Furthermore, note that the local policies 324a may include a policy which specifically indicates the action to be performed if none of the local policies 324a covers the request. If the local policies 324a include such a policy, then the local security agent 306a may perform the action specified by that policy if the local security agent 306a determines that none of the local policies 324a covers the request.

If the local security agent 306a's current security mode is blocking security mode, then the local security agent 306a waits until both the client certification exchange is completed and until the information from the certificate has been used to check with respect to the relevant set of policies whether to allow or deny the communication (FIG. 4B, operation 442). If the local security agent 306a determines that the request should be allowed, then the local security agent 306a allows the connection request (FIG. 4B, operation 436); otherwise, the local security agent 106a denies the connection request (FIG. 4B, operation 444). The local security agent 306a also denies the connection request (FIG. 4B, operation 444) if, in operation 438, the local security agent 306a determines that its current security mode is not blocking security mode.

Referring now to FIG. 4C, a flowchart is shown of a method 400c that is performed by the destination local security agent 306b in one embodiment of the present invention to process the incoming connection request 330 from the source application 304a. Note that although the method 400c of FIG. 4C is illustrated as being performed after the method 400b performed by the source local security agent 306a in FIG. 4A, this is merely an example and not a requirement of the present invention. For example, the method 400c of FIG. 4C may begin before the method 400b of FIG. 4B has completed. As a particular example, the method 400c of FIG. 4C may begin after the source local security agent 306a transmits the connection request 330 to the destination system 302b, and before the remainder of the method 400b completes.

The destination local security agent 306b intercepts the inbound connection request 330 transmitted by the source local security agent 306a, and blocks the request 330 from proceeding further at least until the destination local security agent 306b has evaluated whether the request 330 matches a local policy (FIG. 4C, operation 448). The local security agent 306b identifies, based on the request, the application 304b that is the destination of the request (FIG. 4C, operation 450).

The local security agent 306b evaluates the request 330 against the locally stored policies 324b in order to determine whether to allow or deny the request 330 based on any one or more of the following, in any combination: the identity of the destination application 304b, the IP address and port of the source application 304a, some or all of the contents of the request 330, and the local policy data 324b (FIG. 4C, operation 452).

The local security agent 306b determines, based on its evaluation, whether one of the local policies 324b covers the communication request 330 (FIG. 4C, operation 454). If one of the local policies 324b does cover the request, then the local security agent 306b determines whether the covering policy allows or denies the request (FIG. 4C, operation 456). If the covering policy allows the request, then the local security agent 306b determines whether the covering policy is current, such as in any of the ways disclosed herein in connection with FIG. 2C (FIG. 4C, operation 458).

If the covering policy is current, then the local security agent 306b sets its security mode to optimistic mode (FIG. 4C, operation 466); otherwise, the local security agent 306b sets its current security mode to pessimistic security mode (FIG. 4C, operation 464). If the covering policy allows the request 330, then the local security agent 306b allows the request 330 (FIG. 4C, operation 472), regardless of whether the local policy is current.

If, in operation 472 of FIG. 4C, the local security agent 306a decides to allow the communication request 330, then, in general, the local security agent 306b allows the communication request 330 to be provided to the destination application. In other words, the local security agent 306b may unblock the communication request 330 so that it may be received by the destination application 304b.

If, in operation 454, the local security agent 306b determines that none of the local policies 324b covers the request 330, or, in operation 456, the local security agent 306b determines that the covering policy denies the request 330, then the local security agent 306b determines whether its current security mode is blocking security mode (FIG. 4C, operation 460). Furthermore, note that the local policies 324b may include a policy which specifically indicates the action to be performed if none of the local policies 324b covers the request. If the local policies 324b include such a policy, then the local security agent 306b may perform the action specified by that policy if the local security agent 306b determines that none of the local policies 324b covers the request.

If the local security agent 306b's current security mode is blocking security mode, then the local security agent 306b waits until both the client certification exchange is completed and until the information from the certificate has been used to check with respect to the relevant set of policies whether to allow or deny the communication (FIG. 4C, operation 462). If the local security agent 306b determines that the request should be allowed, then the local security agent 306b allows the connection request 330 (FIG. 4C, operation 272); otherwise, the local security agent 306a denies the connection request 330 (FIG. 4C, operation 468). The local security agent 306b also denies the connection request 330 (FIG. 4C, operation 468) if, in operation 460, the local security agent 306b determines that its current security mode is not blocking mode.

The net effect of the method 400 shown in FIGS. 4A-4C is that:
- the source local security agent 306a makes an informed decision about whether to allow or deny the connection request based on the information available to it at the time; and
- if the connection is allowed, the destination local security agent 306b makes an informed decision about whether to allow or deny the request based on the information available at the time.

One of the advantages of embodiments of the invention shown in FIGS. 3 and 4A-4C is that they may be used to enable the network policies 318 to be enforced in a distributed manner by the local security agents 306a-b, without the use of a centralized backend, such as the remote system 312.

One of the advantages of embodiments of the present invention is that they may be used to protect against policy violations without requiring alterations to the source application 104a, the destination application 104b, or the network traffic between them (e.g., the communication request 130). This ability simplifies the installation, configuration, and maintenance of the system 100 greatly in comparison to systems which require applications and/or network traffic to be modified in order to detect policy violations.

Another advantage of embodiments of the present invention is that they have visibility into the network-related information of both the source and destination sides of a network communication, thereby enabling network security policies to be validated based on such information from both sides. This provides significant advantages over prior art systems, which use only information from the source or the destination, and which therefore lack, for example, information about the identity of the application executing on the other side of the communication. Access to information from both sides of network communications enables embodiments of the present invention to identify and prevent violations of network security policies which cannot be identified accurately using prior art techniques that rely solely on information from one side of the communication.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention intercept and then may block network connection requests. Such features are applicable only within the context of networked communications and cannot be performed mentally and/or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

The invention claimed is:

1. A non-transitory computer-readable medium having computer program instructions stored thereon, the computer program instructions being executable by at least one computer processor in a policy management engine system communicatively coupled to a network to perform steps of:
    obtaining state information from a plurality of systems, wherein the state information includes application state information and network topology information for each system of the plurality of systems;
    providing a set of policies to each system of the plurality of systems, wherein the set of policies specify both a source application and a destination application and whether the source application and the destination application are authorized to communicate with one another, wherein each system of the plurality of systems utilize the set of policies for evaluation to avow or block applications thereon; and
    providing a root certificate to each system of the plurality of systems, wherein the root certificate is utilized, by each system of the plurality of systems, in addition to the set of policies to determine whether the source application and the destination application are authorized to communicate with one another.

2. The non-transitory computer-readable medium of claim 1, wherein the steps further include
    obtaining events from the plurality of systems corresponding to policy decisions at each of the source application and the destination application on corresponding systems; and
    performing a reconciliation that can include causing termination of a connection after being allowed based on the evaluation at the corresponding systems.

3. The non-transitory computer-readable medium of claim 1, wherein, subsequent to the providing steps, the plurality of systems are responsible for policy enforcement for the source application and the destination application.

4. The non-transitory computer-readable medium of claim 1, wherein the set of policies include translating applications into Internet Protocol address and port combinations.

5. The non-transitory computer-readable medium of claim 1, wherein the set of policies includes a security mode for a type of connection, wherein the security mode is one of a plurality of modes and the security mode determines how each system evaluates involvement of the policy management engine system in the evaluation to allow or block applications thereon.

6. The non-transitory computer-readable medium of claim 1, wherein the steps further include
    prior to providing the root certificate, creating the root certificate, wherein the policy management engine system is trusted by all of the plurality of systems, and each system of the plurality of systems creates an intermediate certificate from the root certificate.

7. The non-transitory computer-readable medium of claim 6, wherein each system of the plurality of systems create a client certificate based on its intermediate certificate.

8. The non-transitory computer-readable medium of claim 7, wherein the client certificate is used between systems for establishing trust to determine whether the source application and the destination application are authorized to communicate with one another.

9. A policy management engine system comprising:
    at least one computer processor; and
    memory having computer program instructions, the computer program instructions being executable by the at least one computer processor communicatively coupled to a network to perform steps of:
        obtaining state information from a plurality of systems, wherein the state information includes application state information and network topology information for each system of the plurality of systems;
        providing a set of policies to each system of the plurality of systems, wherein the set of policies specify both a source application and a destination application and whether the source application and the destination application are authorized to communicate with one another, wherein each system of the plurality of systems utilize the set of policies for evaluation to allow or block applications thereon; and
        providing a root certificate to each system of the plurality of systems, wherein the root certificate is utilized, by each system of the plurality of systems, in addition to the set of policies to determine whether the source application and the destination application are authorized to communicate with one another.

10. The policy management engine system of claim 9, wherein the steps further include
obtaining events from the plurality of systems corresponding to policy decisions at each of the source application and the destination application on corresponding systems; and
performing a reconciliation that can include causing termination of a connection after being allowed based on the evaluation at the corresponding systems.

11. The policy management engine system of claim 9, wherein, subsequent to the providing steps, the plurality of systems are responsible for policy enforcement for the source application and the destination application.

12. The policy management engine system of claim 9, wherein the set of policies include translating applications into Internet Protocol address and port combinations.

13. The policy management engine system of claim 9, wherein the set of policies includes a security mode for a type of connection, wherein the security mode is one of a plurality of modes and the security mode determines how each system evaluates involvement of the policy management engine system in the evaluation to allow or block applications thereon.

14. The policy management engine system of claim 9, wherein the steps further include
prior to providing the root certificate, creating the root certificate, wherein the policy management engine system is trusted by all of the plurality of systems, and each system of the plurality of systems creates an intermediate certificate from the root certificate.

15. The policy management engine system of claim 14, wherein each system of the plurality of systems create a client certificate based on its intermediate certificate.

16. The policy management engine system of claim 15, wherein the client certificate is used between systems for establishing trust to determine whether the source application and the destination application are authorized to communicate with one another.

17. A method comprising:
obtaining state information from a plurality of systems; wherein the state information includes application state information and network topology information for each system of the plurality of systems;
providing a set of policies to each system of the plurality of systems, wherein the set of policies specify both a source application and a destination application and whether the source application and the destination application are authorized to communicate with one another, wherein each system of the plurality of systems utilize the set of policies for evaluation to allow or block applications thereon; and
providing a root certificate to each system of the plurality of systems, wherein the root certificate is utilized, by each system of the plurality of systems, in addition to the set of policies to determine whether the source application and the destination application are authorized to communicate with one another.

18. The method of claim 17, further comprising
prior to providing the root certificate, creating the root certificate, wherein the policy management engine system is trusted by all of the plurality of systems, and each system of the plurality of systems creates an intermediate certificate from the root certificate.

19. The method of claim 18, wherein each system of the plurality of systems create a client certificate based on its intermediate certificate.

20. The method of claim 19, wherein the client certificate is used between systems for establishing trust to determine whether the source application and the destination application are authorized to communicate with one another.

* * * * *